Feb. 19, 1929.
A. MORRIS
1,702,449
VEHICLE BRAKE
Filed Sept. 8, 1927
2 Sheets-Sheet 1
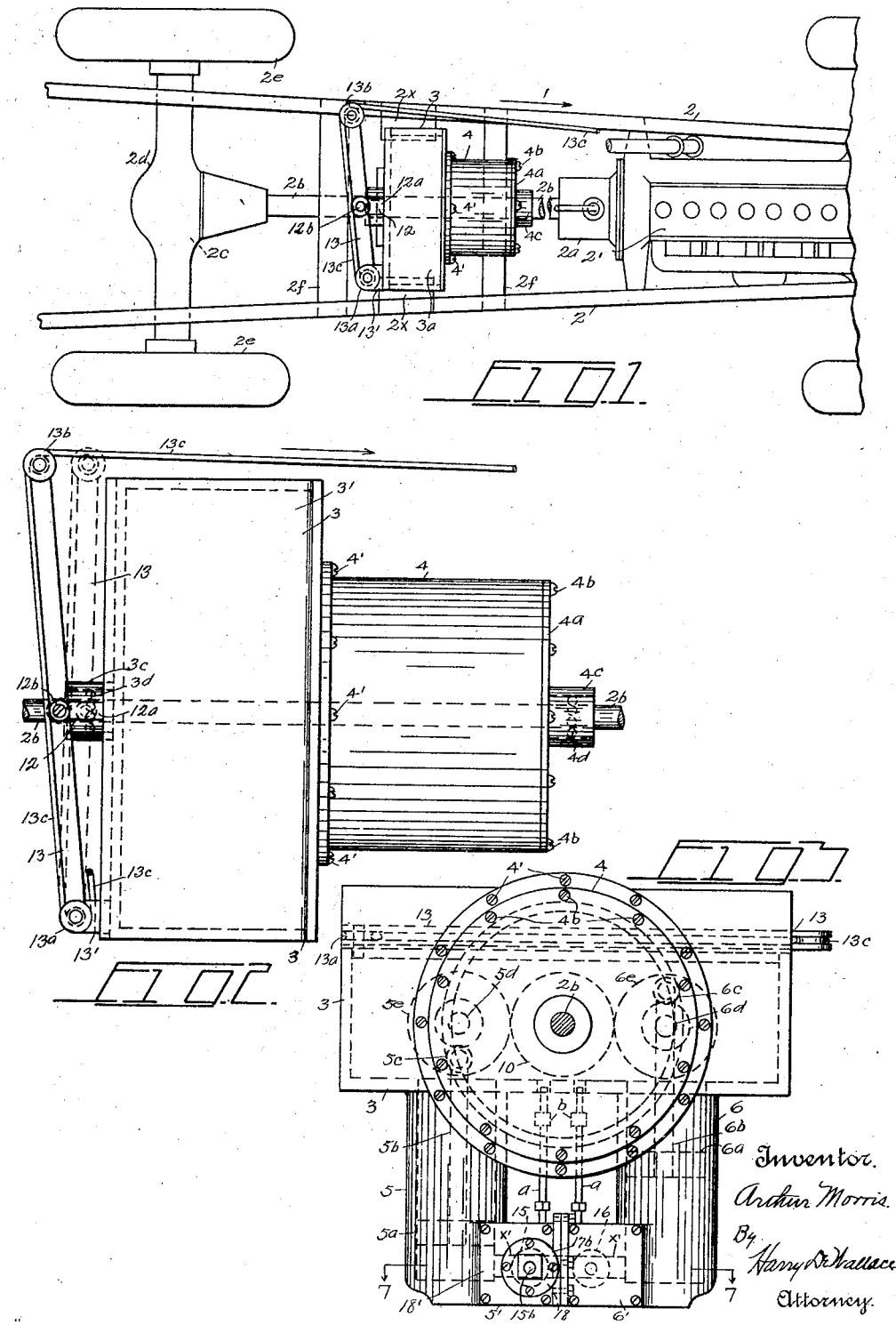
Inventor.
Arthur Morris.
By
Harry D. Wallace
Attorney.

Feb. 19, 1929.  
A. MORRIS  
1,702,449  
VEHICLE BRAKE  
Filed Sept. 8, 1927   2 Sheets-Sheet 2
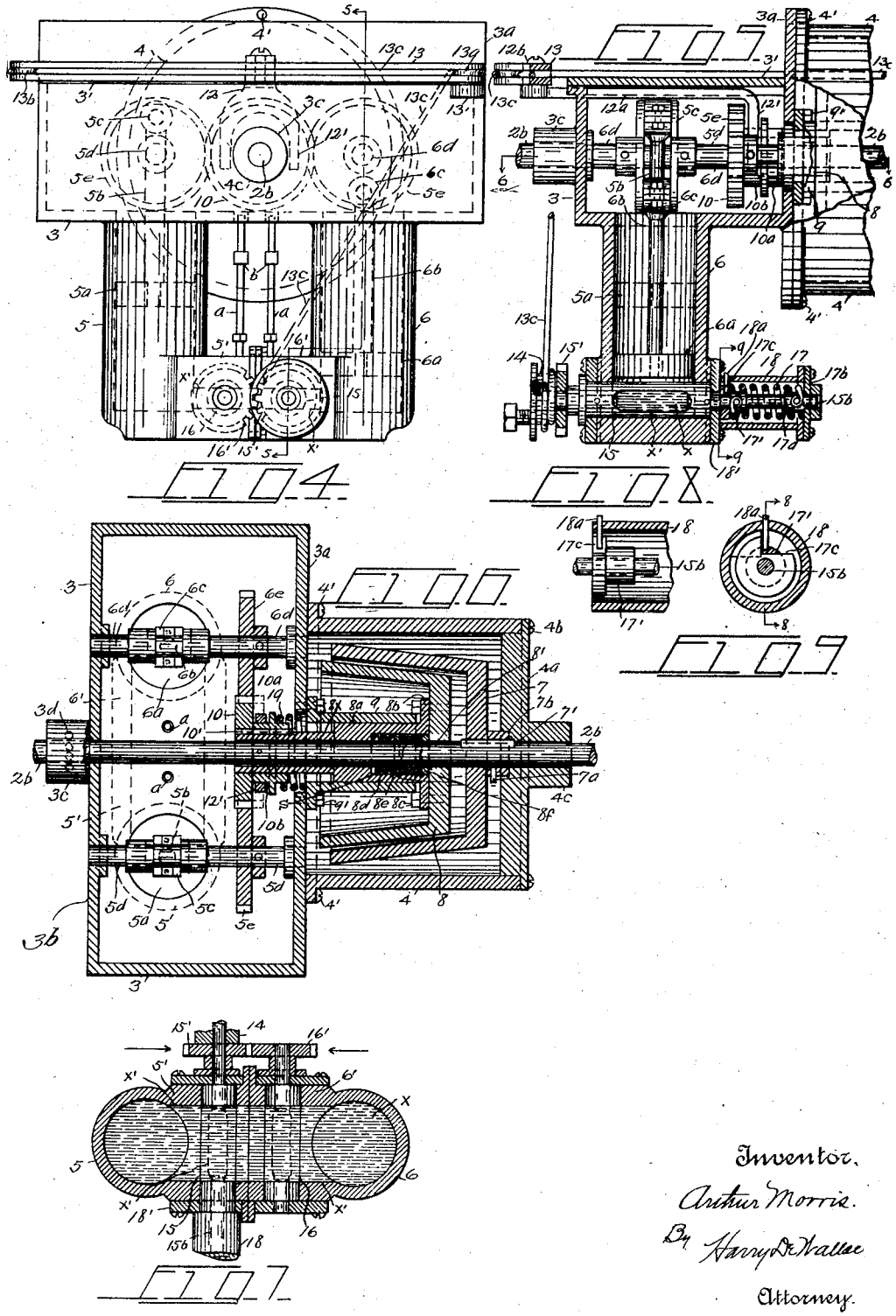

Patented Feb. 19, 1929.

1,702,449

UNITED STATES PATENT OFFICE.

ARTHUR MORRIS, OF SYRACUSE, NEW YORK.

VEHICLE BRAKE.

Application filed September 8, 1927. Serial No. 218,339.

This invention relates to vehicle brakes, designed particularly for automobiles and other motor-driven vehicles, or machines, and has for its object to provide a mechanism, wherein the braking-power is applied directly to the main driving-shaft, instead of the wheels or the axles of the vehicle. A further object is to provide a friction clutch, one member of which is constantly driven by the shaft which transmits the power of the motor to the running-gear of the vehicle, the other member of the clutch being actuated by the ordinary brake-pedal, and being directly controlled by the driver. A further object is to provide hydraulic means for slowing down and stopping the vehicle, the said means being controlled by the pedal simultaneously with the interlocking of the clutch members, the said hydraulic means comprising a pair of fluid pumps, which are reciprocated by the main shaft through the said clutch, the said pumps being controlled during the braking periods by a twin-valve mechanism that restricts the flow of the liquid from one pump to the other, the said valves being arranged to entirely stop the said flow and thereby cause the cessation of all movements of the driving and braking mechanisms. And a further object is to provide automatic means for opening the valves and restoring the free communication between said pumps, as well as releasing the clutch, and effecting the return movement of the pedal.

I attain these objects by the means set forth in the detailed description which follows, and as illustrated by the accompanying drawings, in which—

Figure 1 is a broken top plan view of the chassis of an automobile to which my improvement is applied. Fig. 2 is an enlarged top plan view of the braking mechanism shown in Fig. 1. Fig. 3 is a front end elevation of the device. Fig. 4 is a rear end elevation of the same. Fig. 5 is a vertical cross-section, taken on line 5—5 of Fig. 4, showing one of the pumps and the corresponding valve; also showing the clutch shifting means. Fig. 6 is a horizontal section taken on line 6—6 of Fig. 5 showing the cone-clutch, the pumps, and related parts. Fig. 7 is a horizontal section, taken on line 7—7 of Fig. 3, showing the twin valves that control the pumps. Fig. 8 is a broken vertical longitudinal section, taken on line 8—8 of Fig. 9. And Fig. 9 is a vertical cross-section, taken on line 9—9 of Fig. 5.

In the drawings, 2 represents a broken plan view of the chassis of an automobile, the running-gear of which includes a motor $2'$, and transmission $2^a$. $2^b$ represents the power-shaft beyond the transmission, which may connect and drive any suitable differential $2^c$, the latter usually being enclosed in a housing $2^d$, at the opposite ends of which the rear wheels $2^e$ are operatively mounted. The opposite sides of the chassis are usually tied together by similar transverse braces, as $2^f$.

My braking mechanism consists of a rectangular gear-box 3, having a normally open top, which is closed by a cover $3'$. The forward wall $3^a$ of the box 3 extends above the plane of the cover, and supports a cylindrical housing 4, which may be secured thereto by fasteners $4'$. The ends of the housing 4 are normally open, and the free end thereof is preferably closed by a circular cap $4^a$, which may be held in place by fasteners $4^b$. The outer face of the cap $4^a$ is formed with a hub $4^c$, which may be arranged to house a ball-bearing $4^d$. The rear wall $3^b$ of the box 3 is also provided with a similar hub $3^c$, in which is disposed a similar ball-bearing $3^d$, as shown in Fig. 2. The brake mechanism is mounted between the side rails of the chassis 2, and is preferably supported by one of the braces $2^f$, and by similar brackets $2^x$. The brake mechanism is so disposed that its longitudinal axis corresponds to the axis of shaft $2^b$, and the said shaft passes loosely through the box 3 and the housing 4, and is supported and has its bearings in the hubs $3^c$ and $4^c$, as shown in Figs. 1, 2, 3 and 6. The forward wall $3^b$, and the corresponding end of the housing 4 are open, and afford free positioning of the shaft $2^b$.

5 and 6 represent similar pump cylinders, which may be cast with the bottom of the box 3, the said cylinders being hollow and depending from the said bottom, the bottoms of said cylinders being formed with similar inturned hollow arms $5'$—$6'$, and the facing ends of said arms being formed with flanges which may be bolted together, as shown in Figs. 3 and 4. By this construction the cylinders normally communicate with each other, and also with the box 3 by registering openings, as shown in Figs. 5 and 6. The braking of the vehicle is effected mainly by hydraulic means, preferably by any suitable oil, as $x$, the latter being disposed in the bottom portions of the cylinders 5—6 and in said arms, and the said oil being displaced or pumped from one cylinder to the other, by means of similar pistons $5^a$—$6^a$ operated by rods $5^b$—$6^b$ and opposing cranks $5^c$—$6^c$, which pump the oil back and forth when the pistons are reciprocated, the said cranks being rigid on shafts $5^d$—$6^d$, whose opposite ends are journaled in the front and rear walls of the box 3 (see Fig. 6). The pumps $5^a$—$6^a$ are operated by similar gears $5^e$—$6^e$. The oil $x$ is usually poured into the gear-box 3, and gravitates to the arms $5'$—$6'$ through pipes $a$ in which may be located any suitable check-valves, as $b$, shown conventionally in Figs. 3 and 4, for preventing the return of the oil to the box 3.

7 represents a relatively large hollow conical clutch member, which is disposed in the housing 4, its closed end being bored out to receive the shaft $2^b$, to which the cone is connected, by a key $7'$. The member 7 is preferably held from axial movement on the shaft by a set-screw $7^a$, and its closed end is preferably formed with a hub $7^b$, which pivots in an inwardly facing socket of the cap $4^a$ (see Fig. 6). By this construction and arrangement, the cone 7 is positively driven by the power-shaft $2^b$, whether or not said shaft is driven by the motor $2'$ or by the wheels $2^c$ in case the motor is shut-down. The clutch member 7 transmits the power derived from shaft $2^b$ during the braking intervals to a similar axially movable cone 8, which is normally loosely disposed within the larger cone. The closed end of the cone 8 is perforated at $8'$, to loosely receive the shaft $2^b$, and is supported by a concentric sleeve $8^a$ having a flange base $8^b$, which may be secured to the cone by bolts $8^c$. The sleeve $8^a$ (see Fig. 6) telescopes and is reciprocatable in a similar sleeve 9, the latter being rigidly mounted on the forward wall of the box 3, by bolts $9'$. The sleeve $8^a$ is counterbored, as at $8^d$, to receive a compressible packing $8^e$, which is preferably disposed between fibre rings $8^f$. The outer fibre ring bears against the cone 8, while the innermost ring engages a spring $s$ whose tension tends to compress and hold the packing against the shaft $2^b$. The rear or free end of the sleeve $8^a$ is reduced, as at $8^x$, the said reduced portion extending into the box 3 and supporting a spur-gear 10, which is driven by the sleeve $8^a$, by means of a key $10'$. The gear 10 is disposed between and drives the gears $5^e$—$6^e$. The gear 10 is provided with a forwardly facing integral hub $10^a$, which is formed with a circumferential groove $10^b$, the gear and hub being made rigid to and movable axially with the sleeve $8^a$, by means of an inverted L-shaped member 12, the vertical arm of said member comprising a fork $12'$, which engages the groove $10^b$, as shown in Figs. 4, 5 and 6. The horizontal arm $12^a$ of the member 12 extends rearwardly beneath and projects beyond the cover $3'$, and its free end is pivoted at $12^b$ to a rocking lever 13, one end of the said lever being pivoted to a lug $13'$ formed on the box 3. The lever 13 is normally held extended (see full lines in Fig. 2) by a spring 19, interposed between the hub $10^a$ and sleeve 9 (see Fig. 6), which aids in releasing clutch member 8 and related parts, at the end of the braking periods. The opposite ends of the lever 13 are fitted with sheaves $13^a$—$13^b$, that operatively support a cable $13^c$, one end of the cable connecting with the brake-pedal (not shown), which is usually located adjacent the driver's position, the other end of the cable being wound around a drum 14, that is supported by a cylindrical valve 15, the latter being journaled in the arm $5'$ of the cylinder 5, and cooperates with a similar valve 16, for controlling the flow of the oil $x$ from cylinder 5 to cylinder 6, and vice versa. The rear ends of the valves are fitted with meshing-gears $15'$—$16'$. By this arrangement, the pulling of the cable $13^c$ in the direction of the arrows in Figs. 1 and 2, as by the depressing of the brake-pedal, simultaneously rotates the valves 15—16, for restricting or shutting off the flow of the oil $x$ through the arms $5'$—$6'$. The valves 15—16 are correspondingly slotted, as at $x'$ (see Figs. 5 and 7), the said slots being arranged to register with similar openings in the arms of the pump cylinders 5—6, and when the valves are in the open position, shown in Figs. 5 and 7, the oil $x$ may flow at the full capacity of the pumps through the passage $x'$ towards and from said cylinders. The valves 15—16 are normally held in the open position, as long as the pedal is inoperative, by a spiral spring 17, which is disposed in a housing 18 that extends axially from the opposite end of the valve 15, and is supported by a face plate $18'$ that is bolted to the front side of the arm $5'$ (see Figs. 5 and 7). The spring 17 is supported by collars as $17'$—$17^a$. The collar $17'$ is rigid to a gudgeon or shaft $15^b$ carried by the valve 15, the other collar comprsing a hub and a flange $17^b$ which is bolted to the free end of the housing 18 (see Fig. 5). The collar $17'$ has a circumferential notch $17^c$ that is engaged by a pin $18^a$ carried by the housing, for preserving a suitable normal tension of the spring for insuring the positive opening of the valves, and for limiting the rotary movement of the valves during the opening and closing thereof. When the driver of the vehicle steps on the brake-pedal, the pull on the cable 13ᶜ swings the lever 13 towards the box 3 (see Fig. 2), and correspondingly moves the forked lever 12, for shifting the gear 10 and cone 8 towards the cone 7, and starts the pumps 5ᵃ—6ᵃ, by power derived from shaft 2ᵇ. This pulling on the cables simultaneously rotates both valves through gears 15′—16′ in the direction of the arrows in Fig. 7, for restricting or closing the passage $x'$ and retarding or stopping the flow of the oil from one pump to the other. During these shifting operations, the gear 10 slides relatively to the gears 5ᵉ—6ᵉ, as shown by dotted lines in Fig. 6, and for ths purpose the face of gear 10 is preferably broader than the other gears, which prevents the unmeshing of the train during the operation of the clutch member 8. This closing movement of the valves 15—16 decreases the flow of the oil and tends to slow down or entirely stop the rotation of the shaft 2ᵇ and partially or fully brakes the vehicle. The sudden closing of the valves 15—16, as by the short or quick depression of the brake-pedal, effects the instantaneous interlocking of the clutch members 7 and 8, which is usually followed an instant later by the full closing of the valves 15—16. The clutch 7—8 sets in motion the gears 10—5ᵉ—6ᵉ, but owing to the closing of the passage $x'$, the pistons 5ᵃ—6ᵃ become stalled and the resistance offered by the still and incompressible oil is transmitted back towards the shaft 2ᵇ, the differential 2ᶜ, and the rear wheels 2ᵉ, and stops all motion of the driving and braking mechanisms.

My braking mechanism is extremely simple, quick acting and very powerful. By assigning to the brake-pedal the complementary control of the mechanical as well as hydraulic elements, the effective actions of said elements are so coordinated that the first slight depression of the pedal simultaneously effects the engagement of the clutch members 7—8 and the initial closing movement of the valves 15—16, which correspondingly restricts the flow of the oil $x$ through the passage $x'$. This restriction to the flow of the oil offers corresponding resistance to the pumps and reacts to reduce the speed of the shaft and accordingly the slowing down of the vehicle. By the peculiar construction and arrangement of the braking mechanism, it is immaterial whether or not shaft 2ᵇ is being driven by the motor 2′, or by the momentum of the vehicle in case the motor is shut down. If the driver of the vehicle suddenly depresses the pedal to the full extent, the shaft 2ᵇ and the wheels 2ᵉ will come to an abrupt stop, and nothing short of the breaking of the shaft or the destruction of some vital part of the braking mechanism will render the brake ineffectual.

Having thus described my invention, what I claim is—

1. A braking mechanism for automobiles, comprising a housing mounted between the motor and differential, a pair of depending fluid cylinders carried by the housing and communicating therewith and with each other, a drive shaft extending through said housing, a positively driven clutch member carried by said shaft, a second clutch member loosely mounted on said shaft and formed to engage with and to be driven by said first named clutch member, pistons in said cylinders, drive means connecting the pistons and second named clutch member, a pair of valves between the cylinders, and means for simultaneously connecting the clutch members to drive said pistons and for closing said valves, whereby rotation of the drive shaft is prevented.

2. A braking mechanism for automobiles, comprising a housing mounted between the motor and differential, a pair of depending fluid cylinders carried by the housing and communicating therewith and with each other, a main drive shaft connecting the motor and differential and extending through said housing, pistons in said cylinders, a pair of drive shafts for the pistons mounted one upon each side of the main shaft within said housing, a casing connected to the housing and extending forwardly therefrom, a positively driven clutch member carried by said main drive shaft and disposed within said casing, a second clutch member within said casing loosely mounted on said shaft and formed to engage with and to be driven by the first named clutch member, drive means connecting the pistons and second named clutch member, a pair of valve members between the cylinders, and means for simultaneously connecting the clutch members to drive said pistons and for closing said valves whereby rotation of the main drive shaft is prevented.

3. A braking mechanism for automobiles comprising a substantially rectangular housing having front, rear and end walls and disposed between the motor and differential, a pair of depending fluid cylinders carried by the housing and communicating therewith and with each other, pistons in said cylinders, a sleeve connected to the front wall of the housing and extending forwardly therefrom, a cylindrical casing connected to the front wall of the housing and extending forwardly therefrom, said casing being concentric to and spaced from said sleeve, a main drive shaft connecting the motor and differential and extending through the housing and casing, a positively driven clutch member connected to said shaft and disposed within said casing, a second clutch member loosely mounted on the drive shaft within the casing and having a part journaled in said sleeve, a pair of drive shafts for the pistons mounted one upon each side of the main shaft within said housing, drive means connecting the pistons and the second named clutch members, spring means interposed between the rear of the front wall of the housing and the last named drive means for normally holding the clutch members disengaged, a pair of valve members between the cylinders, and means for simultaneously connecting the clutch members to drive said pistons and for closing said valves, whereby rotation of the main drive shaft is prevented.

In testimony whereof I affix my signature.

ARTHUR MORRIS.